United States Patent
Li et al.

(10) Patent No.: US 11,657,156 B2
(45) Date of Patent: May 23, 2023

(54) MALWARE SCAN IN RESPONSE TO POWER CHANGE

(71) Applicant: Lenovo (Singapore) Pte. Ltd., Singapore (SG)

(72) Inventors: Scott Wentao Li, Cary, NC (US); Robert J. Kapinos, Durham, NC (US); Russell Speight VanBlon, Raleigh, NC (US); Robert Norton, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 600 days.

(21) Appl. No.: 16/792,210

(22) Filed: Feb. 15, 2020

(65) Prior Publication Data

US 2021/0256128 A1 Aug. 19, 2021

(51) Int. Cl.
*G06F 21/56* (2013.01)

(52) U.S. Cl.
CPC ...... *G06F 21/567* (2013.01); *G06F 2221/034* (2013.01)

(58) Field of Classification Search
CPC ............. G06F 21/567; G06F 2221/034; H04L 63/1416; H04L 63/1441; H04L 63/145
See application file for complete search history.

(56) References Cited

U.S. PATENT DOCUMENTS

| | | | | |
|---|---|---|---|---|
| 8,010,815 B2 * | 8/2011 | Hamilton, II | ......... | G06F 1/3203 713/320 |
| 8,560,661 B2 * | 10/2013 | Nazarov | ................. | G06F 21/56 709/223 |
| 8,584,242 B2 * | 11/2013 | Lagar-Cavilla | ....... | G06F 21/566 726/24 |
| 8,701,157 B1 * | 4/2014 | Wilson | .................... | H04L 63/08 726/1 |
| 9,854,024 B2 * | 12/2017 | Halim | ................... | G06F 1/3203 |
| 10,708,459 B2 * | 7/2020 | Takahashi | ............. | G06F 21/608 |
| 2018/0314828 A1 * | 11/2018 | Harrison | ............... | G06F 9/4401 |

OTHER PUBLICATIONS

"Preboot Execution Environment", Wikipedia, retrieved from https://en.wikipedia.org/wiki/Preboot_Execution_Environment on Feb. 6, 2020.

* cited by examiner

*Primary Examiner* — Hosuk Song
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to identify a power change condition in the device, and responsive to the power change condition, execute a scan for malware on the device using an operating system (O.S.) loaded into memory of the device from a server separate from the device.

20 Claims, 6 Drawing Sheets

MALWARE SCAN IN RESPONSE TO POWER CHANGE

FIELD

The present application relates to technically inventive, non-routine solutions that are necessarily rooted in computer technology and that produce concrete technical improvements.

BACKGROUND

As recognized herein, malware may be difficult to detect because it may hide its intrusion by burrowing into the kernel of the operating system, such that it is able to redirect virus scans away from it. Examples of malware are code that can hijack a computer for crypto-mining, and ransomware that may encrypt storage for ransom.

There are currently no adequate solutions to the foregoing computer-related, technological problem.

SUMMARY

Accordingly, in one aspect a device includes at least one processor and storage accessible to the at least one processor. The storage includes instructions executable by the at least one processor to identify a power change condition in the device. The instructions are also executable to, responsive to the power change condition, execute a scan for malware on the device using an operating system (O.S.) of a server separate from the device and different from a native O.S. of the device stored in the device.

The power change condition may include, for example, entering a sleep mode, a deenergization event, or a restart.

In example embodiments the scan for malware on the device using the O.S. from the server separate from the device can include a scan of a native O.S. of the device stored in a drive of the device.

In some implementations the instructions may be executable to load the O.S. of the server into memory of the device, and execute the O.S. of the server from the memory of the device to execute the scan. The memory may include a random access memory (RAM). In other implementations the instructions may be executable to not load the O.S. of the server into memory of the device, and execute the O.S. of the server remotely from the server to execute the scan.

In another aspect, at least one computer readable storage medium (CRSM) that is not a transitory signal includes instructions executable by at least one processor to identify a condition in a device, and responsive to the condition, execute a scan for malware on the device using an operating system (O.S.) of a server different from a native O.S. of the device.

In another aspect, a method includes accessing a server pursuant to a restart, sleep mode entry, or power down of a device. The method also includes using an operating system (O.S.) associated with the server to execute a malware scan of at least an O.S. of the device.

The details of present principles, both as to their structure and operation, can best be understood in reference to the accompanying drawings, in which like reference numerals refer to like parts, and in which:

DETAILED DESCRIPTION

Figure 1:
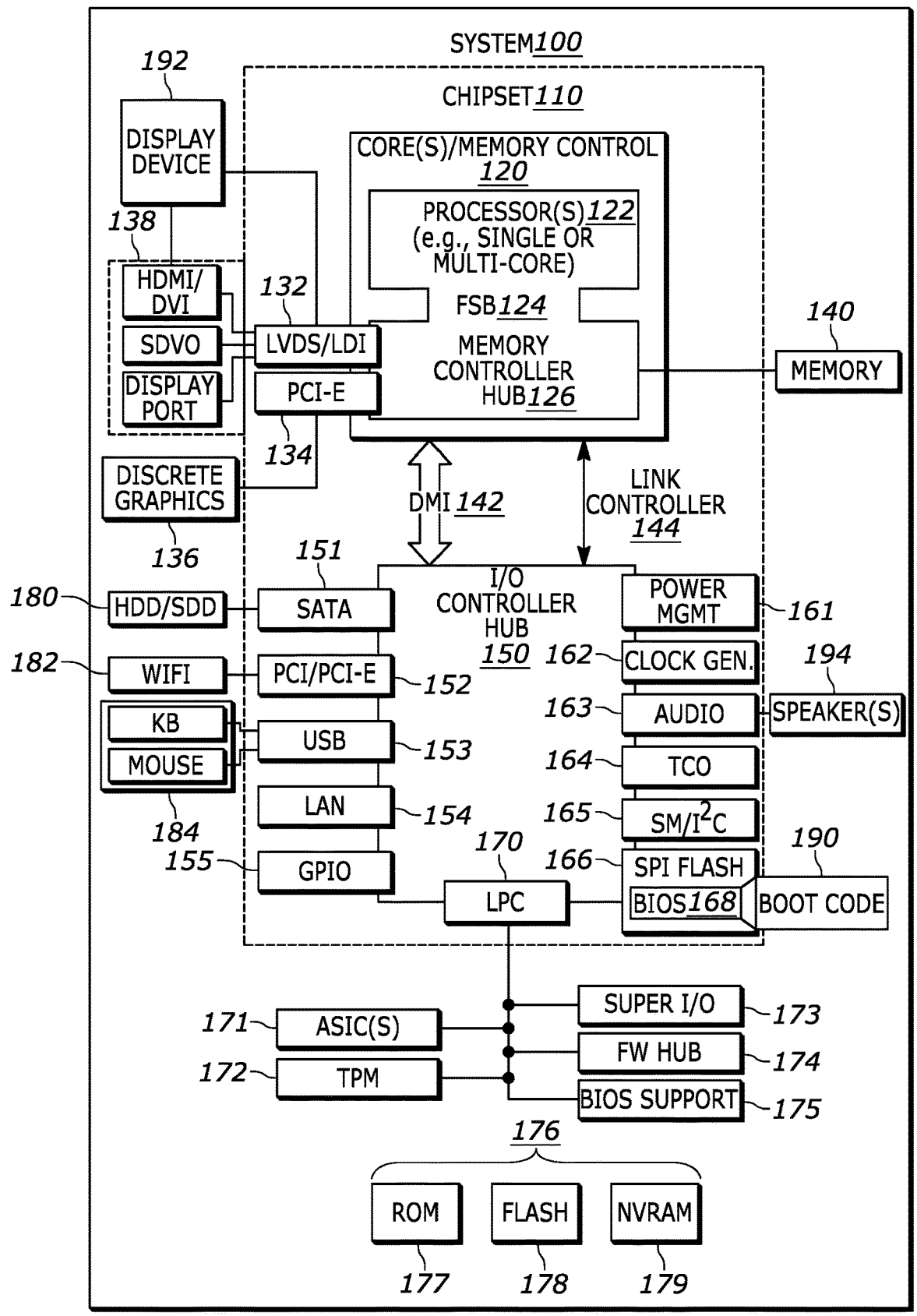
FIG. 1 is a block diagram of an example system consistent with present principles.

Consistent with present principles, offline malware scanning can be triggered by a power change condition such as hibernation or shutdown. For example, a device might be about to enter an off or hibernate state after an extended period of non-usage, and so possible interfering device usage by a user during scanning will already be minimal.

Thus, an example sequence consistent with present principles may include a device changing from an active mode to a sleep mode or hibernate mode. When entering sleep or hibernate, the device may save any content in its memory such as random access memory (RAM) to the hard disk drive (HDD) and/or solid state drive (SSD) of the device. Then a remote boot of the device may be made to a trusted server to acquire a trusted operating system (O.S.) from the server and load it into RAM of the device to perform a malware scan. If desired, after scanning the computer may be deenergized (e.g., turned off from a hibernate or sleep state).

In the case of a native/guest operating system update for the device that may already require restart of the device, an offline scan can be similarly triggered during software update restarts. For example, the first step of an update restart may be to set the bootloader in the basic input-output system (BIOS) resident in memory of the device such as RAM to point to a remote server, such that BIOS acquires the trusted O.S. from the remote server and loads it into RAM (rather than loading the device's own O.S.). The device may then use the O.S. from the server to execute a malware scan instead of its own native O.S. as stored locally on its HDD or SSD that is being updated. The scan may identify and correct/remove malware in the device, including malware that might be in the native O.S. stored on the HDD or SSD and/or malware in separate software applications(s) and other code stored on the device's HDD or SSD. After the scan, the bootloader may then be changed back to point back to the native O.S. in the HDD or SSD of the device to load the native O.S. to complete the restart and/or any updates.

Thus, a malware scan may be executed from a trusted platform for a remotely-booted end-user device. A power state change can trigger the remote scan.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190.

BIOS 168 may be a set of routines (stored, e.g., in read-only memory) that enables a computer to start an operating system and to communicate with the various devices in a system, such as disk drives, keyboards, monitors, printers, and communications ports. In some implementations, functions performed by BIOS may also be performed by other higher level software application programs. Also in some implementations, BIOS may be a Unified Extensible Firmware Interface (UEFI), which may assist in control handoff of a computer system to an operating system during a preboot environment (e.g., after the computer system is powered on, but before the operating system starts).

With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
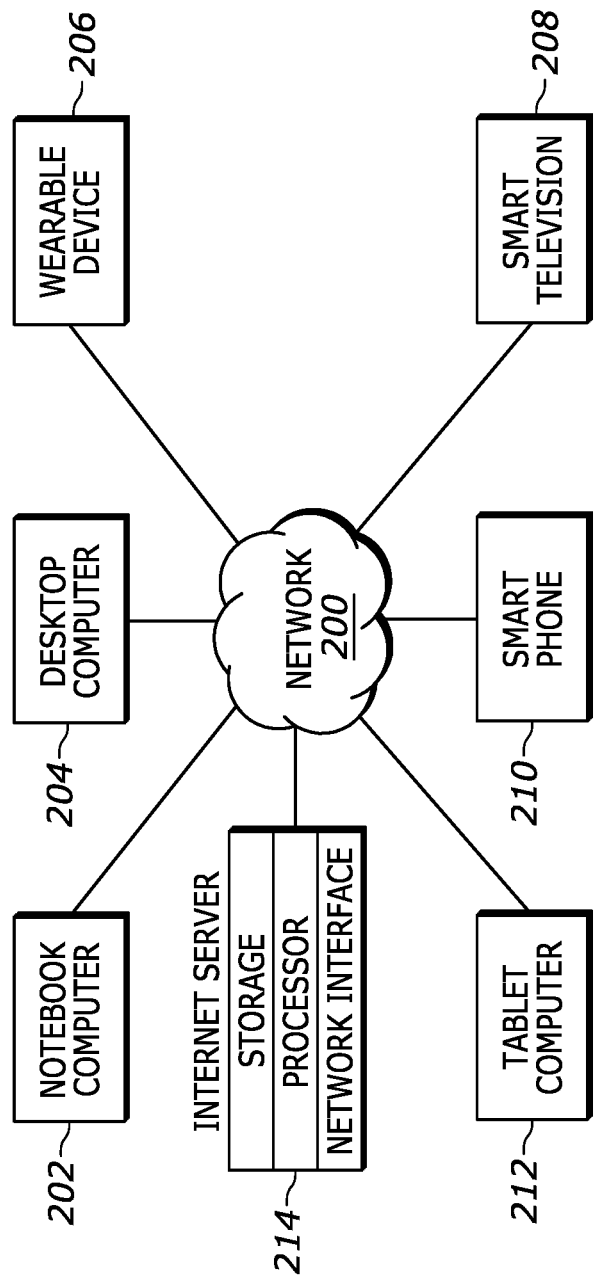
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
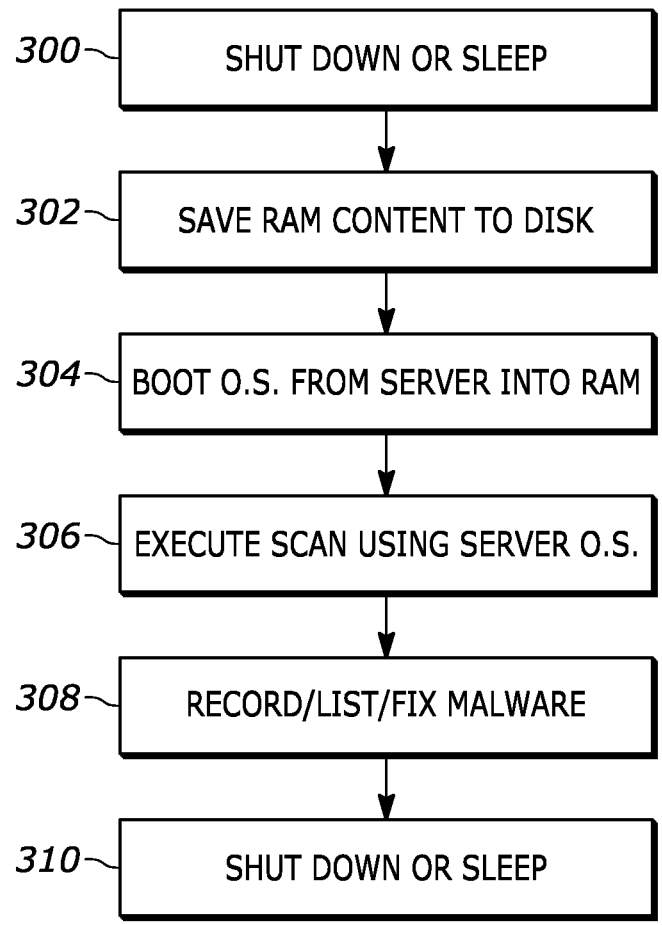
FIGS. 3-5 are flow charts of example algorithms consistent with present principles.

Referring to FIG. 3, it shows example logic that may be executed by a device such as the system 100 in accordance with present principles. Beginning at block 300, the logic enters a shut down or sleep mode. Content in memory such as RAM of the device is saved to more permanent storage such as a solid state drive (SSD) or hard disk drive (HDD) of the device at block 302.

Moving to block 304, prior to complete shutdown if a shutdown command precipitated the logic, a remote server is accessed at block 304 and an operating system from the server is loaded into RAM of the device. This may be done by setting the bootloader (essentially a pointer) in the basic input-output system (BIOS) of the device and/or in firmware of the device to indicate the server O.S.'s location on the server itself instead of the native O.S.'s location on the HDD/SSD of the device as it would otherwise point to. In an example, a preboot execution environment (PXE) boot may be used to acquire the server O.S. from a trusted server. In accessing the server, a chain of trust may be used in which the device to be scanned boots to a trusted server with a trusted O.S. and a trusted virus scanner with trusted malware definitions.

Moving to block 306, the processor of the device being scanned executes the O.S. loaded into RAM from the server to execute a malware scan of the device, including a malware scan of the native O.S. of the device resident in the HDD of the device but not currently active, preventing any malware from hiding itself on the native O.S. because the native O.S. is not active. Malware scanning may look for a malware signature and can use existing scanning and ID techniques. Also note that malware scanning may be performed not just on the native O.S. itself but also on any other code stored on the device, such as for separate software applications.

Any malware discovered may be recorded and/or listed and/or corrected/removed at block 308, and then a sleep mode entered or complete shutdown executed at block 310.

Figure 4:
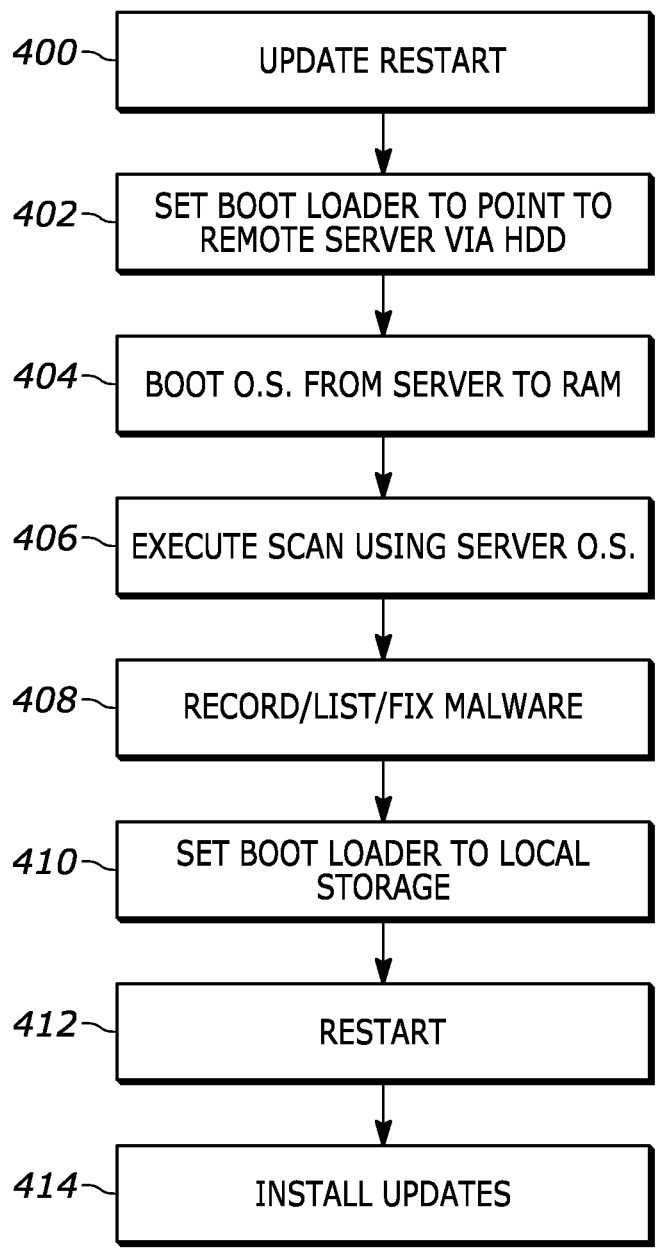

FIG. 4 shows another implementation in which a restart, such as for a software update (e.g., local Windows update), may be commenced at block 400. As understood herein, as is the case with entering a sleep mode or a power down, an update can consume considerable time, and a user already expects his device to be unavailable for a period of time in such case, meaning that exploiting the update restart to execute a malware scan may make the scan less intrusive.

Proceeding to block 402, the boot loader of BIOS/firmware is set to point to the network location of a trusted server instead of to the native O.S. location on the device's HDD or SSD, and then the trusted O.S. is booted into RAM of the device from the server at block 404. A malware scan is executed using the O.S. from the server at block 406 and at block 408 any detected malware is recorded and/or listed on the device and/or resolved automatically, as was the case for FIG. 3 and elsewhere herein. By "resolved" is meant disabled, or deleted, or quarantined, or other action that renders the malware disabled.

From block 408 the logic may move to block 410 to reconfigure the boot loader to point once again to the HDD/SSD location of the device's native O.S., which has now been cleansed of malware, and a restart executed at block 412 by loading the native O.S. from HDD (or SSD) to RAM. Updates may then be installed at block 414.

Note that if a scan gets interrupted by a user trying to boot up the device normally, the results of the scan up to that point can be saved (e.g., file that indicates scanned 50%, and this is what was scanned/done). For any malware files that might have been discovered up to that point, they can be quarantined and/or marked for removal at a later time.

Figure 5:
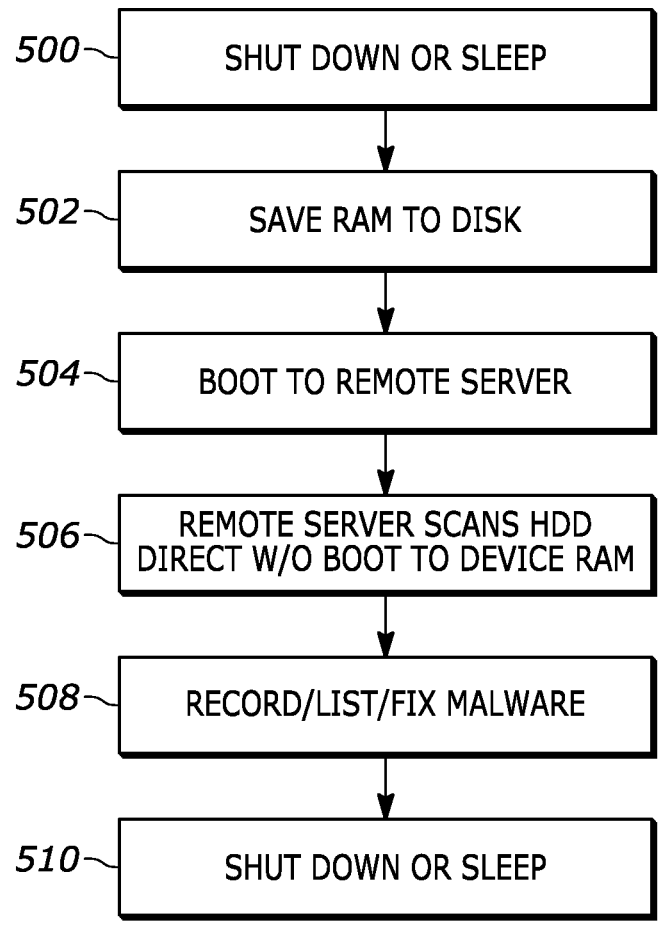

FIG. 5 illustrates yet another technique in which the end-user device essentially plays the role of an external hard drive to the server, the processor of which server executes the malware scan on the device. Commencing at block 500, a power change event occurs such as shut down or sleep. Data in RAM of the device may be saved to HDD or SSD of the device at block 502.

Moving to block 504, the remote server is accessed, i.e., the device to be scanned establishes communication with the server. Proceeding to block 506, the processor of the server executes the O.S. in the server to scan the end user device as it would scan a connected storage device. The HDD or SSD of the device thus is scanned by the server processor executing the server O.S. on the server without loading any O.S., either from the server or from the HDD/SSD of the device, into RAM of the device itself. Detected malware, if any, is recorded/listed/resolved at state 508 and then the end-user device goes to sleep or shuts down or restarts as appropriate at block 510.

Figure 6:
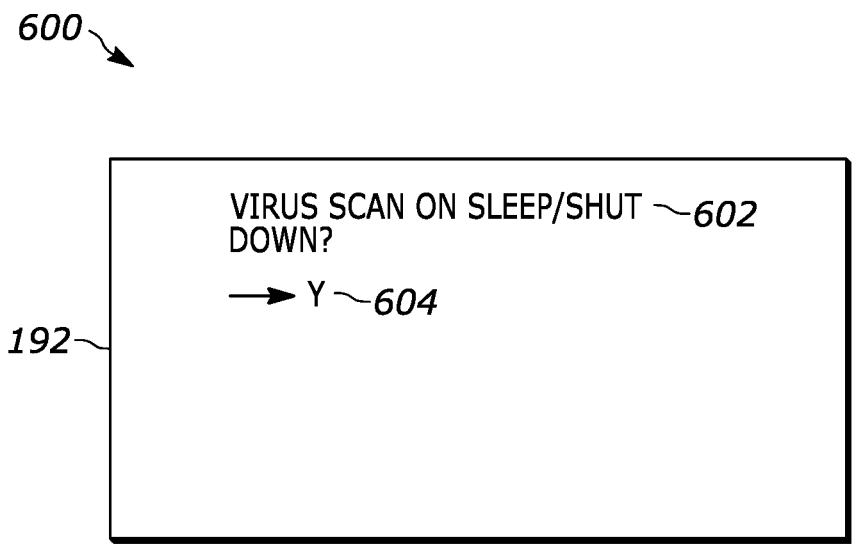
FIGS. 6 and 7 are example user interfaces (UI) consistent with present principles.
Figure 7:
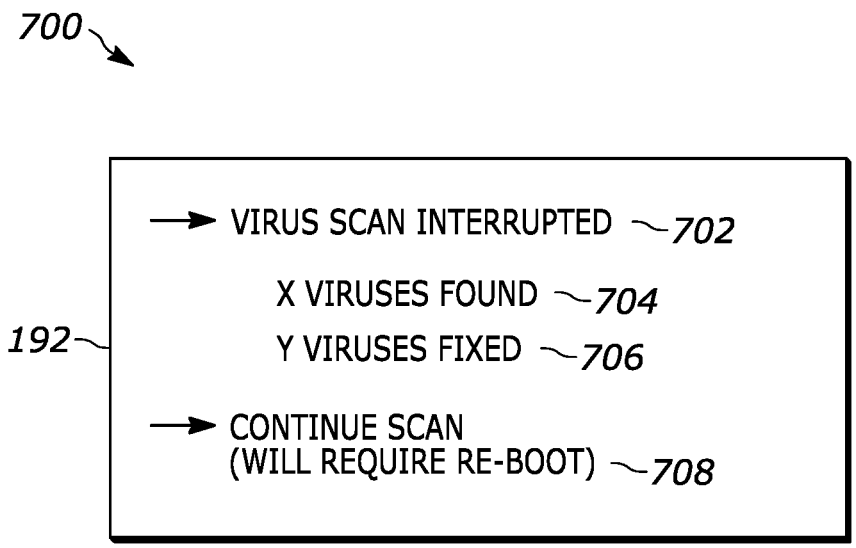

FIGS. 6 and 7 illustrate respective UIs 600, 700 that may be presented on an end user display such as the display 192 in FIG. 1. The UI 600 of FIG. 6 may include a prompt 602 to select to execute a malware scan (which includes virus scans) using a selector 604 upon an event such as entering sleep mode or shutting down.

The UI 700 of FIG. 7 may include an indication 702 that the malware scan was interrupted as alluded to above. The UI 700 also may indicate at 704 how many viruses were found and at 706 how many were resolved. The user may select a selector 708 to continue the scan from, e.g., the HDD/SSD location at which the scan was terminated prematurely. The user may be advised that a reboot will be required at the completion of the scan.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
    at least one processor; and
    storage accessible to the at least one processor and comprising instructions executable by the at least one processor to:
    identify a power change condition in the device; and
    responsive to the power change condition, execute a scan for malware on the device using an operating system (O.S.) of a server separate from the device and different from a native O.S. of the device stored in the device;
    wherein the instructions are executable to:
    load the O.S. of the server into memory of the device; and
    execute the O.S. of the server from the memory of the device to execute the scan.

2. The device of claim 1, wherein the power change condition comprises entering a sleep mode.

3. The device of claim 1, wherein the power change condition comprises a deenergization event.

4. The device of claim 1, wherein the power change condition comprises a restart.

5. The device of claim 1, wherein the scan for malware on the device using the O.S. from the server separate from the device comprises a scan of a native O.S. of the device stored in a drive of the device.

6. The device of claim 1, comprising the memory, wherein the memory comprises a random access memory (RAM).

7. The device of claim 1, wherein the instructions are executable to:
in a first instance, not load the O.S. of the server into memory of the device;
in the first instance, execute the O.S. of the server at the server and remotely from the device to execute the scan;
in a second instance, load the O.S. of the server into the memory of the device; and
in the second instance, execute the O.S. of the server from the memory of the device to execute the scan.

8. At least one computer readable storage medium (CRSM) that is not a transitory signal, the computer readable storage medium comprising instructions executable by at least one processor to:
identify a condition in a device; and
responsive to the condition, execute a scan for malware on the device using an operating system (O.S.) of a server different from a native O.S. of the device;
wherein the instructions are executable to:
not load the O.S. of the server into memory of the device; and
execute the O.S. of the server at the server and remotely from the device to execute the scan.

9. The CRSM of claim 8, wherein the condition comprises entering a sleep mode.

10. The CRSM of claim 8, wherein the condition comprises a deenergization event.

11. The CRSM of claim 8, wherein the condition comprises a restart.

12. The CRSM of claim 8, wherein the scan for malware on the device using the O.S. of the server comprises a scan of a native O.S. of the device stored in a drive of the device.

13. The CRSM of claim 8, wherein the instructions are executable to:
in a first instance, load the O.S. of the server into the memory of the device;
in the first instance, execute the O.S. of the server from the memory of the device to execute the scan;
in a second instance, not load the O.S. of the server into the memory of the device; and
in the second instance, execute the O.S. of the server at the server and remotely from the device to execute the scan.

14. The CRSM of claim 13, wherein the memory comprises a random access memory (RAM).

15. The CRSM of claim 8, wherein the condition is a power change condition.

16. A method, comprising:
identifying a condition in a device; and
responsive to identifying the condition in the device, executing a scan for malware on the device using an operating system (O.S.) of a server different from an O.S. of the device;
wherein the method comprises:
not loading the O.S. of the server into memory of the device; and
executing the O.S. of the server at the server and remotely from the device to execute the scan.

17. The method of claim 16, wherein the condition comprises entering a sleep mode.

18. The method of claim 16, wherein the condition comprises a deenergization event.

19. The method of claim 16, wherein the condition comprises a restart.

20. The method of claim 16, wherein the condition is a power change condition.

* * * * *